(12) United States Patent
Liang et al.

(10) Patent No.: US 10,107,337 B2
(45) Date of Patent: Oct. 23, 2018

(54) BEARING ASSEMBLY

(71) Applicant: AKTIEBOLAGET SKF, Göteborg (DE)

(72) Inventors: Baozhu Liang, Dittelbrunn Hambach (DE); Jesko-Henning Tanke, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/105,980

(22) PCT Filed: Dec. 18, 2014

(86) PCT No.: PCT/EP2014/078348
§ 371 (c)(1),
(2) Date: Jun. 17, 2016

(87) PCT Pub. No.: WO2015/091719
PCT Pub. Date: Jun. 25, 2015

(65) Prior Publication Data
US 2016/0312833 A1    Oct. 27, 2016

(30) Foreign Application Priority Data

Dec. 20, 2013 (DE) .................. 10 2013 226 834
Jan. 15, 2014 (DE) .................. 10 2014 200 588

(51) Int. Cl.
*F16C 33/72*    (2006.01)
*F16J 15/3232*  (2016.01)
*F16J 15/16*    (2006.01)
*F16C 33/78*    (2006.01)
(Continued)

(52) U.S. Cl.
CPC ........ *F16C 33/726* (2013.01); *F16C 33/7886* (2013.01); *F16J 15/164* (2013.01); *F16J 15/3232* (2013.01); *F16J 15/3296* (2013.01); *F16C 19/06* (2013.01); *F16C 2300/14* (2013.01)

(58) Field of Classification Search
CPC  F16C 33/726; F16C 33/7886; F16C 2300/14; F16J 15/164; F16J 15/3232; F16J 15/3296
See application file for complete search history.

(56) References Cited

U.S. PATENT DOCUMENTS 3,572,379 A    3/1971  Popa et al.
3,833,277 A    9/1974  Jones et al.
(Continued)

FOREIGN PATENT DOCUMENTS

CN    2926649 Y     7/2007
CN    102549285 A   7/2012
(Continued)

*Primary Examiner* — James Pilkington
(74) *Attorney, Agent, or Firm* — Bryan Peckjian; SKF USA Inc. Patent Dept.

(57) ABSTRACT

A bearing assembly includes a bearing for supporting a first machine part relative to a second machine part, a seal assembly configured to seal a first space in a region of the bearing relative to a second space, a pressure equalization passage fluidically connecting the first space and the second space, a valve configured to open and close the pressure equalization passage, and a controller configured to control the valve.

15 Claims, 1 Drawing Sheet

(51) Int. Cl.
*F16J 15/3296* (2016.01)
*F16C 19/06* (2006.01)

(56) References Cited

U.S. PATENT DOCUMENTS

| | | | | |
|---|---|---|---|---|
| 4,497,172 A | * | 2/1985 | Smith | F16C 33/76 |
| | | | | 184/6.11 |
| 2012/0219246 A1 | | 8/2012 | Shimizu et al. | |
| 2012/0315127 A1 | | 12/2012 | Zheng et al. | |
| 2012/0315137 A1 | * | 12/2012 | Alvarez | F01D 25/18 |
| | | | | 415/229 |

FOREIGN PATENT DOCUMENTS

| | | |
|---|---|---|
| DE | 19543571 A1 | 5/1997 |
| DE | 19935014 B4 | 3/2005 |
| DE | 102004052684 A1 | 5/2006 |
| DE | 102007020007 A1 | 10/2008 |
| DE | 102011011165 A1 | 8/2012 |
| EP | 1881243 A1 | 1/2008 |
| EP | 2495467 A2 | 9/2012 |
| JP | 2004-52924 * | 7/2002 |
| JP | 2004052924 A | 2/2004 |
| JP | 2008223883 A | 9/2008 |

* cited by examiner

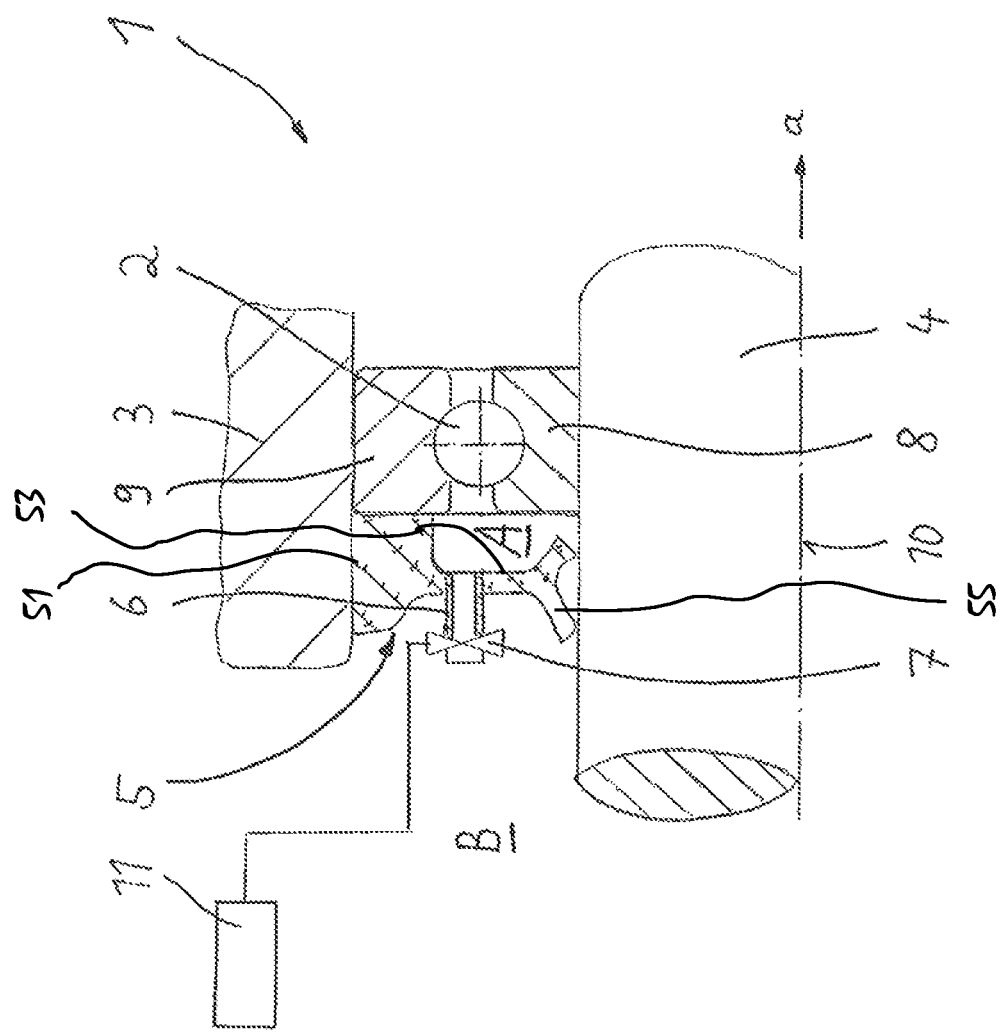

BEARING ASSEMBLY

CROSS-REFERENCE

This application is the U.S. National Stage of International Application No. PCT/EP2014/078348 filed on Dec. 18, 2014, which claims priority to German patent application no. 10 2013 226 834.3 filed on Dec. 20, 2013, and to German patent application no. 10 2014 200 588.4. filed on Jan. 15, 2014.

TECHNOLOGICAL FIELD

The invention relates to a bearing assembly comprising at least one bearing for supporting a first machine part relative to a second machine part, wherein the bearing assembly further comprises a seal assembly in order to seal a first space in the region of the bearing against a second space, wherein at least one pressure equalization line is available that fluidically connects the first space to the second space.

BACKGROUND

A bearing assembly of the above-described type is known from U.S. Pat. No. 3,833,277 A, U.S. Pat. No. 3,572,379 A, DE 10 2004 052 684 A1, DE 10 2007 020 007 A1, US 2012/0219246 A1, EP 2 495 467 A2, DE 199 35 014 B4, EP 1 881 243 A1, DE 195 43 571 A1, and DE 10 2011 011 165 A1 show similar and other solutions.

In particular with sealed large bearings, depending on size, changes in the pressure in the interior of the bearing assembly relative to the ambient pressure arise due to temperature changes even more than in normal-sized bearings. This is caused by, among other things, different thermal expansions of air and lubricant and of the steel rings of the bearing. If the bearing is provided with seals, this pressure negatively affects the function of the seals. The results are greater wear and higher friction. Furthermore, the seal effect can also be negatively influenced.

A pressure difference between the bearing interior and the environment can also act in a direction for which the seal function was not constructed. In this case, for example, moisture or contaminants can penetrate into the bearing.

It is known to provide in the bearing assembly outlet bores for excess lubricating grease that are connected to collecting systems on the bearing assembly. Lubricant is discharged from the bearing through these outlet systems. However, for this purpose a certain overpressure is required in the bearing in order to press the lubricant through the required lines in the collecting container. The outlet bore can also be clogged by excess lubricating grease such that an influencing of the pressure in the interior of the bearing assembly is not possible therewith.

SUMMARY

The object of the invention is to further develop a bearing assembly of the above-described type such that the seal function is improved. This should occur in particular in the case of large bearings wherein pressure differences between the interior of the bearing and the environment can act in a very disadvantageous manner.

The solution of this object by the invention is characterized in that the pressure equalization line is provided with at least one valve with which the pressure equalization line can be opened and closed, wherein the at least one valve is actuatable mechanically or hydraulically or pneumatically or electrically by a controller.

Here the pressure equalization line to the environment can be formed by a tube or a hose that penetrates a (preferably stationary) bearing ring of the bearing. It can also be formed by a tube or a hose that penetrates the seal assembly. The pressure equalization line can also be formed by a bore that penetrates the seal assembly or a bearing ring. Here the tube, the hose, or the bore preferably extends in the axial and/or radial direction.

The bearing can also include a rotating inner ring and a stationary outer ring, wherein the bearing axis is horizontally disposed, wherein in this case it is preferably provided that the at least one pressure equalization line is disposed above the bearing axis.

Correspondingly the bearing can include a stationary inner ring and a rotating outer ring, wherein the bearing axis is horizontally disposed, wherein it is then preferably provided that the at least one pressure equalization line is disposed below the bearing axis.

The bearing rings of the bearing preferably have a diameter of at least 250 mm, preferably of at least 500 mm. The bearing is thus preferably a large bearing.

However, it is preferably further provided that in intended use the bearing has a product of rotational speed and pitch-circle diameter of the rolling elements (n×D) below 100,000 mm/min. In this respect the bearing rotates relatively slowly.

The proposed design is used in particular, but not exclusively, in large bearings that have an outer-ring diameter of more than 300 mm. On the other hand, the use is advantageous as explained in relatively slowly rotating bearings that have the said product of rotational speed and ring diameter (ndm) of less than 100,000 mm/min.

The invention thus provides a pressure equalizing device, which is provided in particular in addition to the above-mentioned outlet bore for lubricant.

One possible embodiment is directed to a system for venting, which is based on an open line. Here one or more lines lead out from the interior of the bearing into the environment, against which the pressure equalization is to occur. This can be a bore in the bearing components or in the sealing system, a hose, or a corresponding tube line, or a combination of these parts. With this design, in the event of internal temperature fluctuations the pressure lines are "blown-through" and thus cleaned so that the bearing is always under the same internal pressure corresponding to the ambient pressure.

An alternative solution is directed to a system of paired valves. Here valves are used that block or can be set for passing. The passing can be controlled. The controlling can occur mechanically, electrically, electronically, hydraulically, or pneumatically. Using the valves a specific mode of operation is thus possible if the above-mentioned outlet bores for lubricant are also provided with corresponding valves. Hereafter the valves can be switched such that either the system or the systems for lubricant outlet are blocked and the lines for the pressure equalization (pressure equalization line) are open in both directions; in another operating mode the pressure equalization is blocked via the pressure equalization line and the lubricant outlet is opened. With this design it is possible to produce a circuitry of the lubricant outlet with the pressure equalization, which circuitry ensures that the device of the pressure equalization is not clogged.

The following has proven for the position of the at least one pressure equalization line:

With rotating inner ring the pressure equalization is preferably in the outer ring or components connected thereto, for example in the seal carrier or in the seal itself, and indeed above all lines for lubricant outlet, i.e., above the horizontally disposed rotational axis of the bearing (i.e., in the region of "9 o'clock" to "3 o'clock." The orientation of the pressure equalization can be radial or axial; the axial orientation is preferred.

With rotating outer ring the pressure equalization is preferably in the inner ring or components connected thereto, for example in the seal carrier or in the seal itself, and indeed below all lines for lubricant outlet, i.e., below the horizontally disposed rotational axis of the bearing (i.e., in the region of "3 o'clock" to "9 o'clock." The orientation of the pressure equalization can be radial or axial.

The position of the pressure equalization is accordingly chosen such that it occurs where the lowest concentration of lubricant mass is expected.

Another aspect of the disclosure comprises a bearing assembly that includes at least one bearing for supporting a first machine part relative to a second machine part. The bearing assembly further comprises a seal assembly including an elastomer seal body and an elastomer flange extending from the seal body and at least one seal lip at an end of the elastomer flange. The seal assembly is configured to seal a first space in a region of the bearing from a second space, and at least one pressure equalization passage fluidically connects the first space to the second space. The pressure equalization passage extends through an unreinforced portion of the elastomer flange and is provided with at least one valve configured to open and close the at least one pressure equalization passage. The at least one valve is actuatable by a controller.

A further aspect of the disclosure comprises a bearing assembly that includes a bearing for supporting a first machine part relative to a second machine part and a seal assembly configured to seal a first space in a region of the bearing relative to a second space. The seal assembly includes a body formed from an elastomer, and a flange consisting essentially of the elastomer extends from body. A pressure equalization passage fluidically connects the first space and the second space and extends through the flange. The assembly also includes a valve configured to open and close the pressure equalization passage and a controller configured to control the valve.

An additional aspect of the disclosure comprises a bearing assembly that includes a bearing for supporting a first machine part relative to a second machine part and a seal assembly configured to seal a first space in a region of the bearing relative to a second space. The seal assembly includes a body formed from an elastomer and a flange comprising the elastomer extending radially from body. A pressure equalization passage fluidically connects the first space and the second space and extends through the elastomer flange and through no other flange. The assembly also includes a valve configured to open and close the pressure equalization passage and a controller configured to control the valve.

The invention thus provides a pressure-equalization- or -exchange system in particular for sealed large bearings.

BRIEF DESCRIPTION OF THE DRAWINGS

An exemplary embodiment of the invention is depicted in the drawing. The single FIGURE shows a radial section through a bearing assembly comprising a bearing and a seal assembly, using which a shaft is supported in a housing.

DETAILED DESCRIPTION

In the FIGURE a bearing assembly 1 is shown that includes a bearing 2, using which a second machine part 4 in the form of a shaft is rotatably supported with respect to a first machine part 3 in the form of a housing. The bearing 2 is sealed by a seal assembly 5 which comprises an elastomer seal body 51, an elastomer flange 53, which is substantially homogeneous, extending from the elastomer seal body 51 and at least one seal lip 55 at an end of the elastomer flange 53. Accordingly there is a first space A in the interior of the bearing assembly 1, which first space A is sealed with respect to a second space B, namely the environment.

In order to be able to achieve a pressure equalization between the two spaces A and B a pressure equalization passage, such as a pressure equalization line 6 is provided. This must generally be effective between the two spaces A and B. In the exemplary embodiment it passes through the seal assembly 5 in axial direction a. As can be seen, the pressure equalization line 6 here is introduced in a carrier, comprised of elastomer material, for the seal lips of the seal assembly 5.

In the exemplary embodiment it is thus provided that the pressure equalization system extends exclusively through the seal assembly. Alternatively or additionally it can also be provided that the pressure equalization occurs via a bearing ring. A pressure equalization via a bore, a hose, or a tube is useful in particular in large bearings since the large bearing ring here offers sufficient space for the fluidic connection.

The inventive design provides that the pressure equalization line 6 is provided with a valve 7, using which the pressure equalization line can be selectively opened or closed. Thus the above-explained operating modes can be driven. According to the invention it is further provided that the valve 7 is actuatable by a controller 11 (mechanically, hydraulically, pneumatically, or electrically). Thus an active controlling of the valve 7 and thus a selective pressure equalization can be ensured, as well as, however, a selective blocking of the valve.

The bearing 2 includes a horizontally oriented bearing axis 10. The preferred position of the pressure equalization line 6 follows or is aligned with said bearing axis.

If the bearing 2 as in the depicted exemplary embodiment has a rotating inner ring 8 and a stationary outer ring 9, the pressure equalization line 6 preferably lies above the bearing axis 10 and thus in a region wherein the concentration of lubricant is low. This region is thus characterized by the region from the "9-o'clock position" to the "3-o'clock position."

If the outer ring 9 rotates and the inner ring 8 is stationary, the pressure equalization line 6 preferably lies below the bearing axis 10. This region is thus characterized by the region from the "3-o'clock position" to the "9-o'clock position."

REFERENCE NUMBER LIST

1 Bearing assembly
2 Bearing
3 First machine part (housing)
4 Second machine part (shaft)
5 Seal assembly
6 Pressure equalization line 7 Valve
8 Inner ring
9 Outer ring
10 Bearing axis
11 Controller
A First space
B Second space
a Axial direction

The invention claimed is:

1. A bearing assembly, comprising at least one bearing for supporting a first machine part relative to a second machine part,
   wherein the bearing assembly further comprises a seal assembly including an elastomer seal body, an unreinforced elastomer flange extending from the seal body and at least one seal lip at an end of the elastomer flange, the seal assembly being configured to seal a first space in a region of the bearing from a second space, wherein at least one pressure equalization passage fluidically connects the first space to the second space,
   wherein the pressure equalization passage extends through the unreinforced elastomer flange and is provided with at least one valve configured to open and close the at least one pressure equalization passage, and wherein the at least one valve is actuatable by a controller.

2. The bearing assembly according to claim 1, wherein the at least one pressure equalization passage comprises a tube or a hose.

3. The bearing assembly according to claim 2, wherein the tube or the hose extends in an axial direction.

4. The bearing assembly according to claim 1, wherein the bearing includes a rotatable inner ring and a stationary outer ring, wherein a bearing axis is horizontally disposed and wherein the at least one pressure equalization passage is disposed above the bearing axis.

5. The bearing assembly according to claim 1, wherein the at least one bearing includes bearing rings and wherein the bearing rings have a diameter of at least 250 mm.

6. The bearing assembly according to claim 1, wherein the at least one valve is mechanically or hydraulically or pneumatically or electrically actuatable.

7. The bearing assembly according to claim 1, wherein the at least one bearing includes bearing rings and wherein the bearing rings have a diameter of at least 500 mm.

8. The bearing assembly according to claim 1,
   wherein the at least one valve is mechanically or hydraulically or pneumatically or electrically actuatable,
   wherein the at least one pressure equalization passage comprises a tube or a hose that passes through the seal assembly and extends in an axial direction,
   wherein a bearing axis is horizontally disposed, and, if the bearing includes a rotatable inner ring and a stationary outer ring, the at least one pressure equalization passage is disposed above the bearing axis and if the bearing includes a stationary inner ring and a rotatable outer ring, the at least one pressure equalization passage is disposed below the bearing axis, and
   wherein bearing rings of the bearing have a diameter of at least 500 mm.

9. The bearing assembly according to claim 1, wherein the pressure equalization passage comprises a tube having a first portion inside the elastomer flange and a second portion outside the elastomer flange and wherein the at least one valve is located in the second portion.

10. A bearing assembly comprising:
    a bearing for supporting a first machine part relative to a second machine part;
    a seal assembly configured to seal a first space in a region of the bearing relative to a second space, the seal assembly including a body formed from an elastomer and a flange extending from the body and consisting of the elastomer;
    a pressure equalization passage fluidically connecting the first space and the second space and extending through the flange,
    a valve configured to open and close the pressure equalization passage, and
    a controller configured to control the valve.

11. The bearing assembly according to claim 10, wherein an axis of the bearing is horizontally disposed, and, if the bearing includes a rotatable inner ring and a stationary outer ring, the at least one pressure equalization passage is disposed above the bearing axis and if the bearing includes a stationary inner ring and a rotatable outer ring, the at least one pressure equalization passage is disposed below the bearing axis.

12. The bearing assembly according to claim 10, wherein the valve is mechanically or hydraulically or pneumatically or electrically actuatable.

13. The bearing assembly according to claim 10, wherein the at least one bearing includes bearing rings and wherein the bearing rings have a diameter of at least 500 mm.

14. The bearing assembly according to claim 10, wherein the pressure equalization passage comprises a tube having a first portion inside the flange and a second portion outside the flange and wherein the at least one valve is located in the second portion.

15. A bearing assembly comprising:
    a bearing for supporting a first machine part relative to a second machine part;
    a seal assembly configured to seal a first space in a region of the bearing relative to a second space, the seal assembly including an elastomer body and a substantially homogeneous flange extending radially from the elastomer body;
    a pressure equalization passage fluidically connecting the first space and the second space and extending through the substantially homogeneous flange and through no other flange,
    a valve configured to open and close the pressure equalization passage, and
    a controller configured to control the valve.

* * * * *